Oct. 12, 1943.     F. A. G. PIRWITZ     2,331,568
PHOTOGRAPHIC SHUTTER
Filed July 19, 1941     8 Sheets-Sheet 1
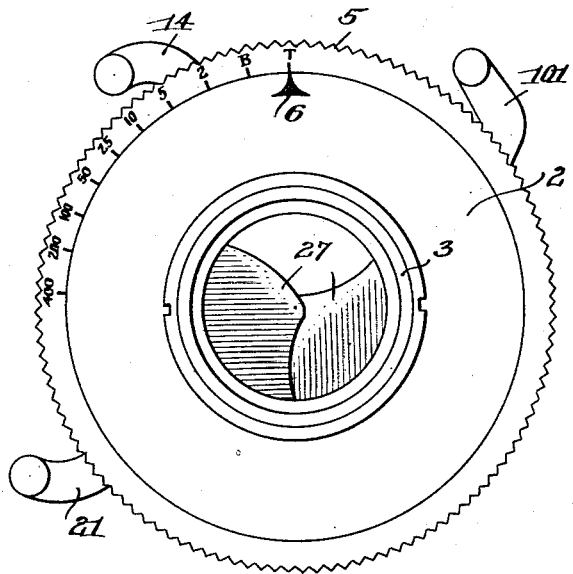
INVENTOR.
Friedrich A. Gustav Pirwitz
BY Harold C. Stonebraker,
his Attorney

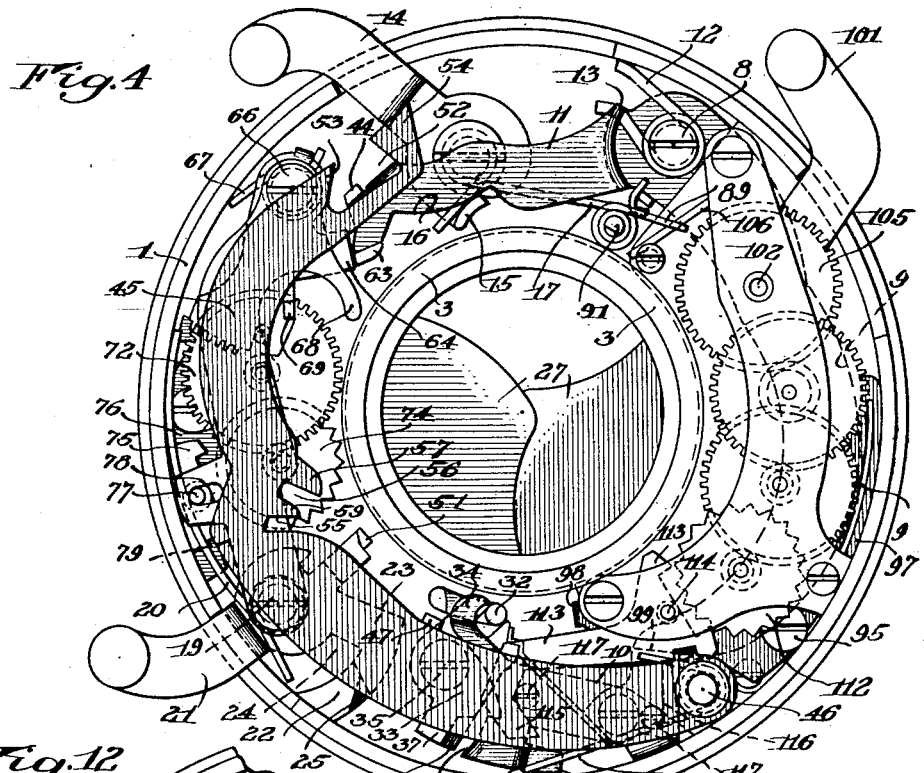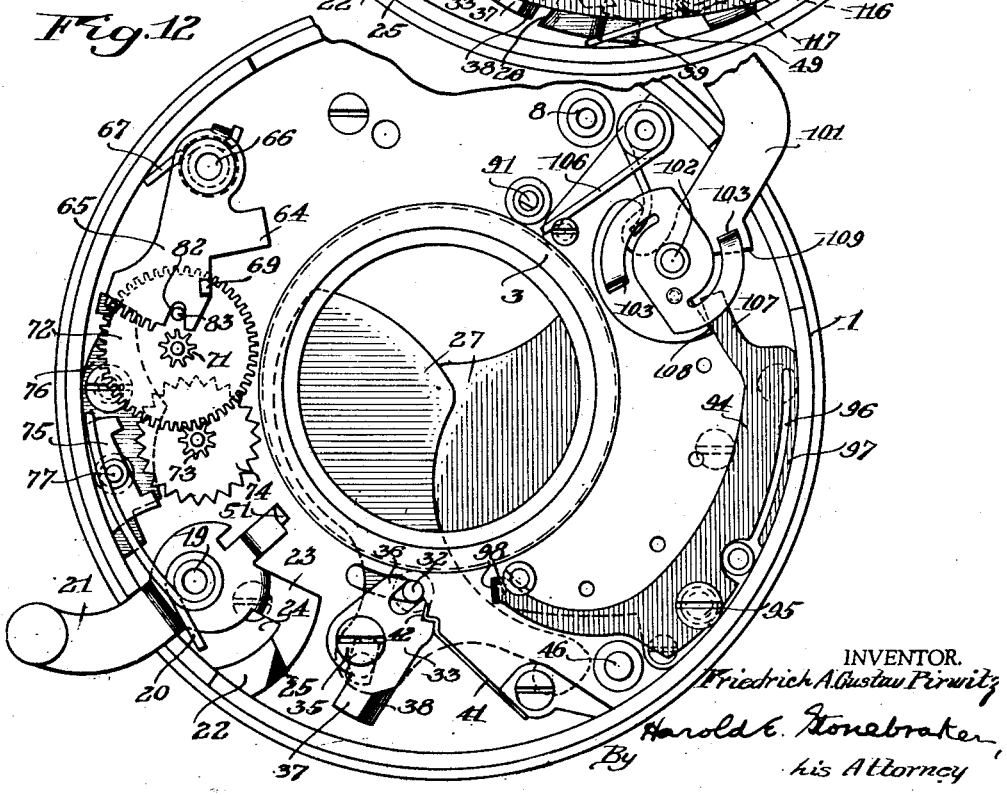

Oct. 12, 1943.   F. A. G. PIRWITZ   2,331,568
PHOTOGRAPHIC SHUTTER
Filed July 19, 1941   8 Sheets-Sheet 3
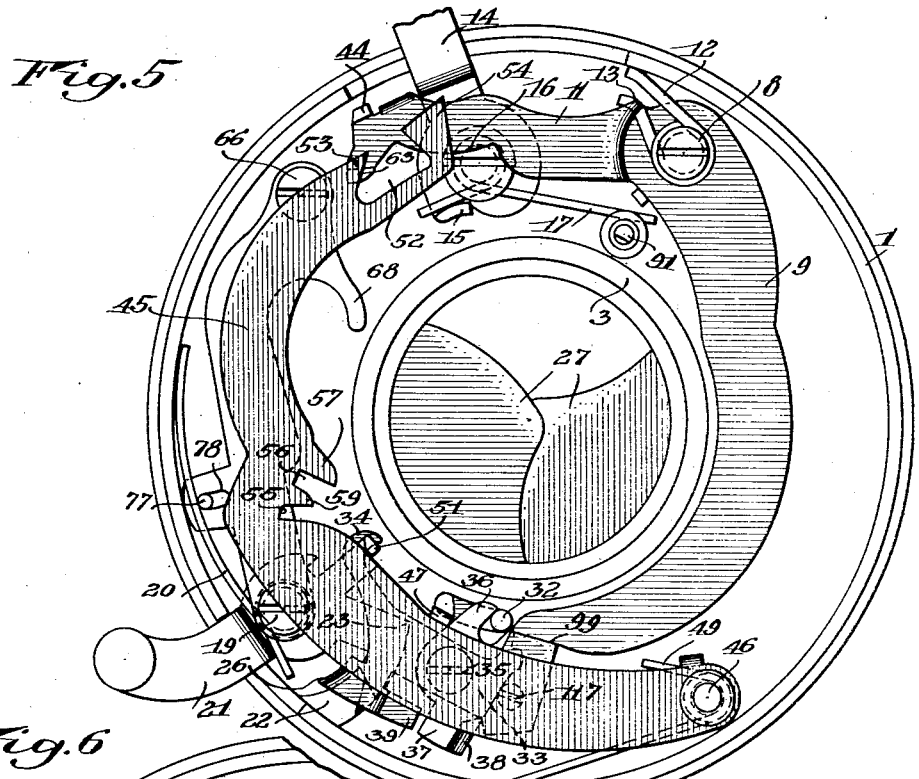
Fig. 5
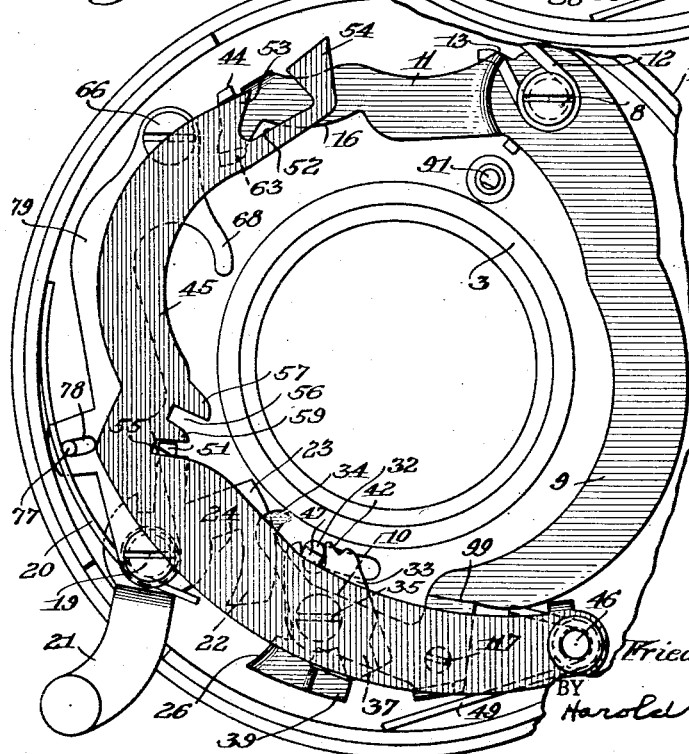
Fig. 6
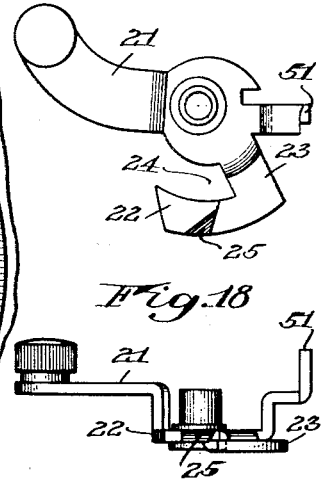
Fig. 17
Fig. 18
INVENTOR.
Friedrich A. Gustav Pirwitz
BY Harold R. Stonebraker
his Attorney

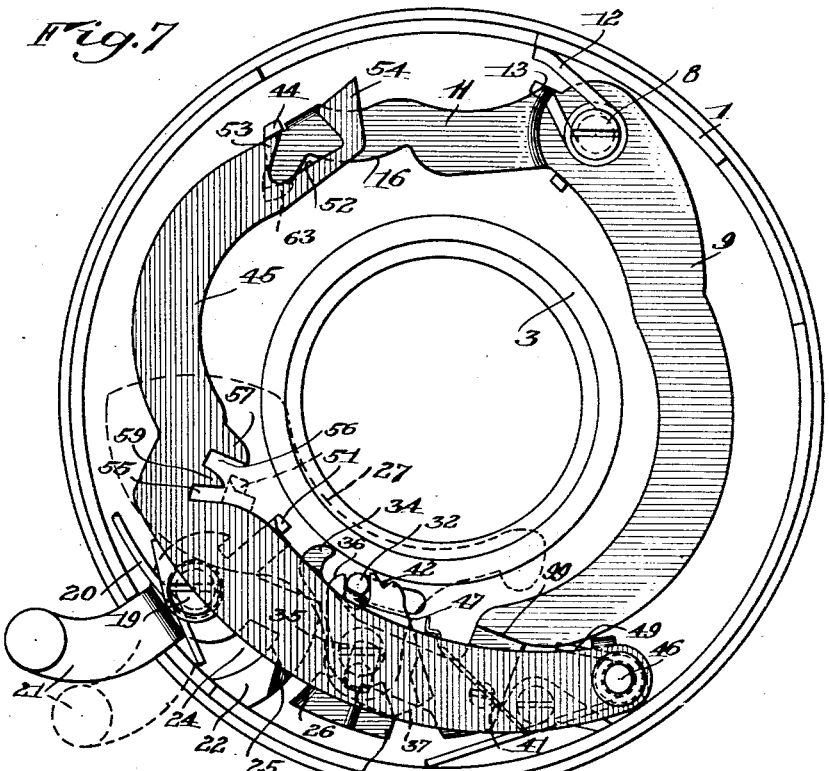
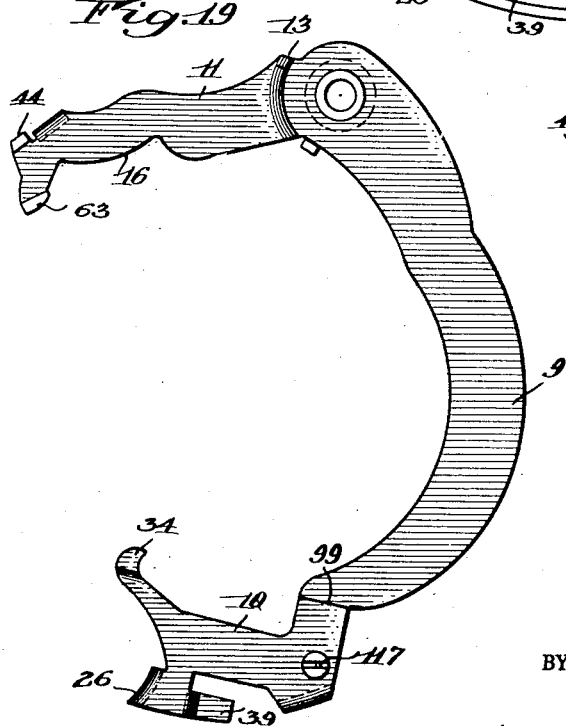
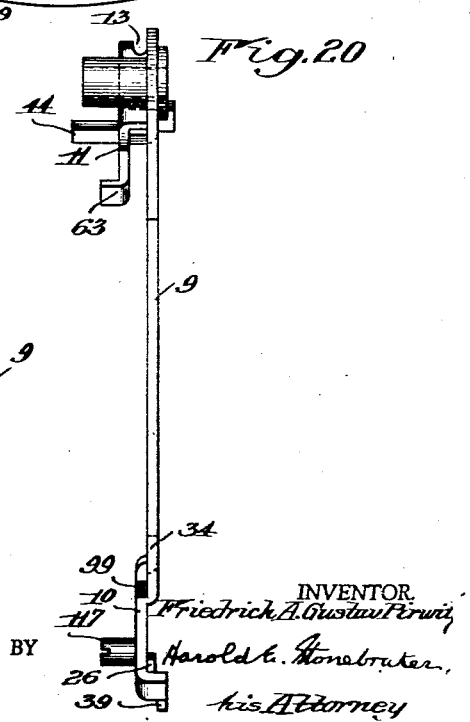

Oct. 12, 1943.   F. A. G. PIRWITZ   2,331,568
PHOTOGRAPHIC SHUTTER
Filed July 19, 1941   8 Sheets-Sheet 5
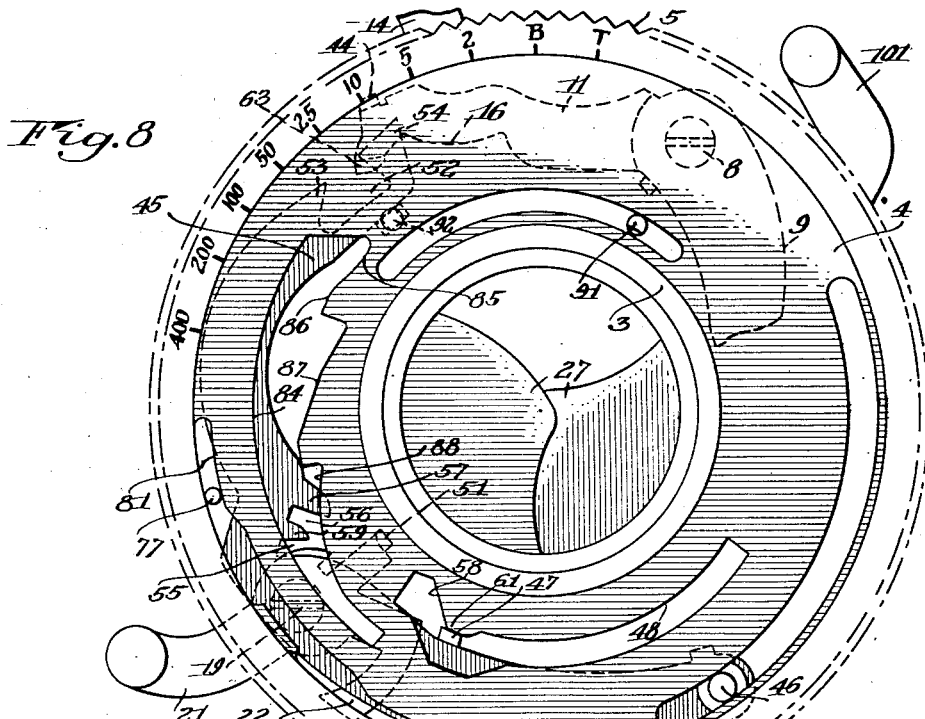
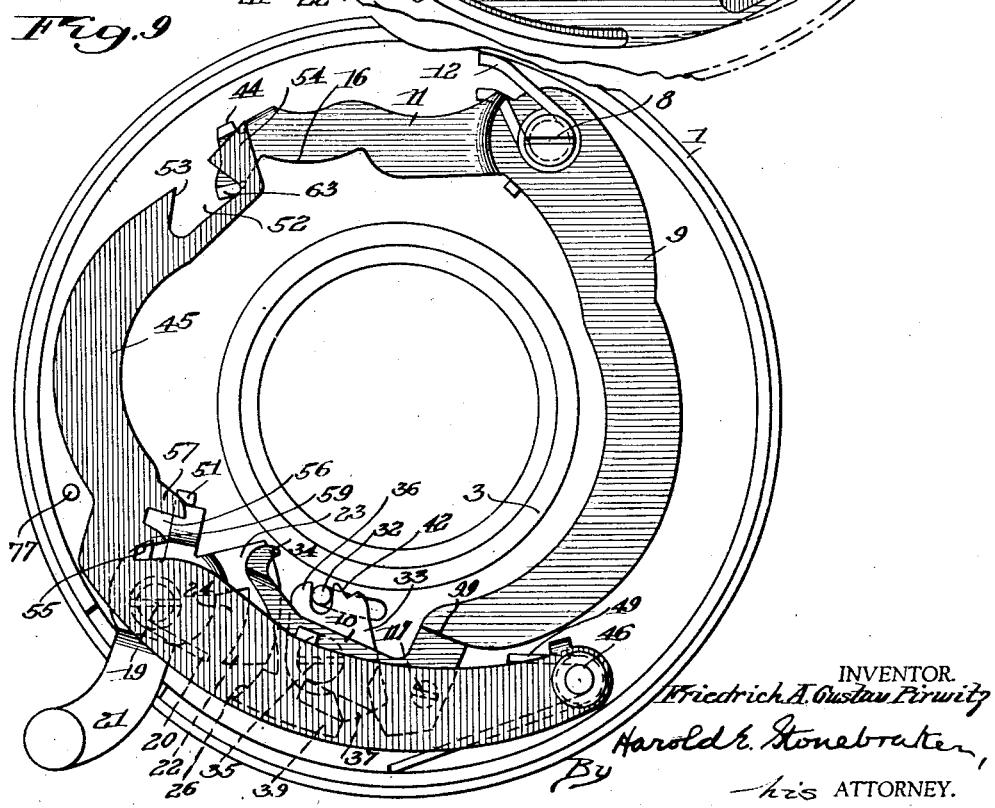
INVENTOR.
Friedrich A. Gustav Pirwitz
By Harold E. Stonebraker,
his ATTORNEY.

Oct. 12, 1943.　　　F. A. G. PIRWITZ　　　2,331,568
PHOTOGRAPHIC SHUTTER
Filed July 19, 1941　　　8 Sheets-Sheet 6
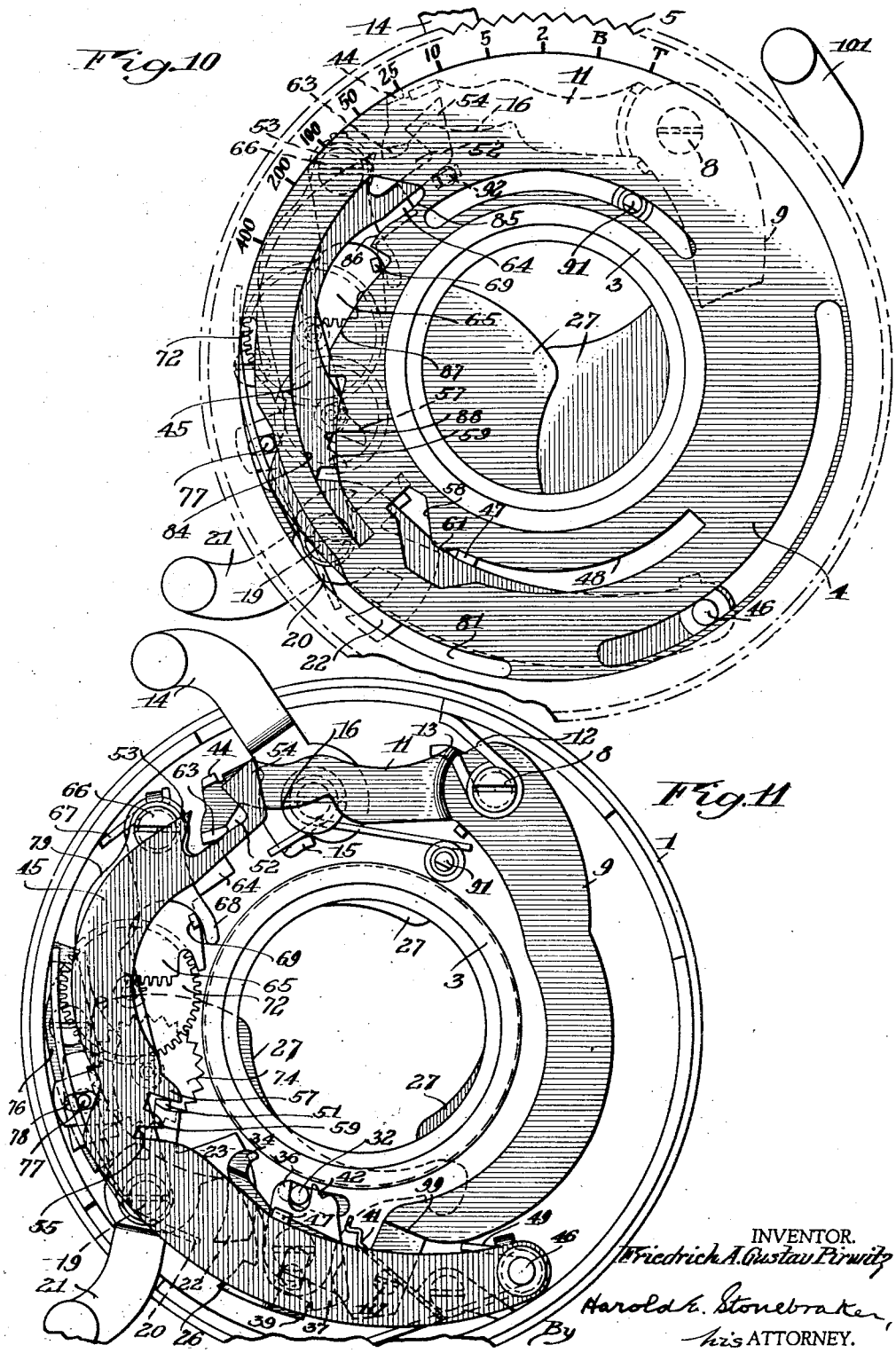
INVENTOR.
Friedrich A. Gustav Pirwitz
Harold E. Stonebraker
By　　his ATTORNEY.

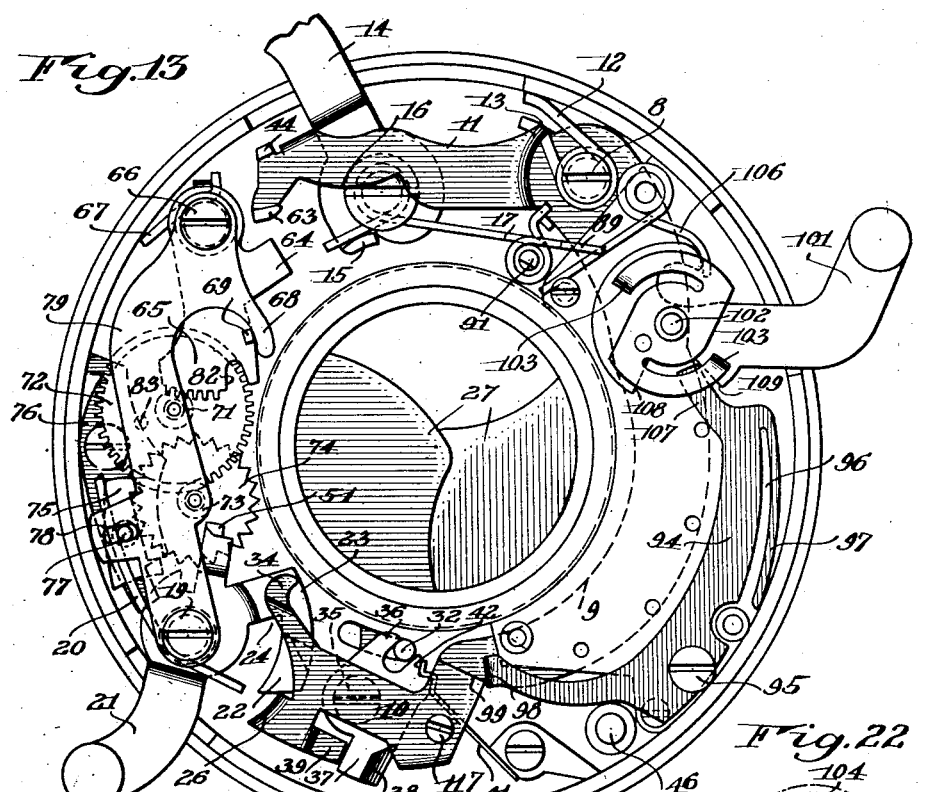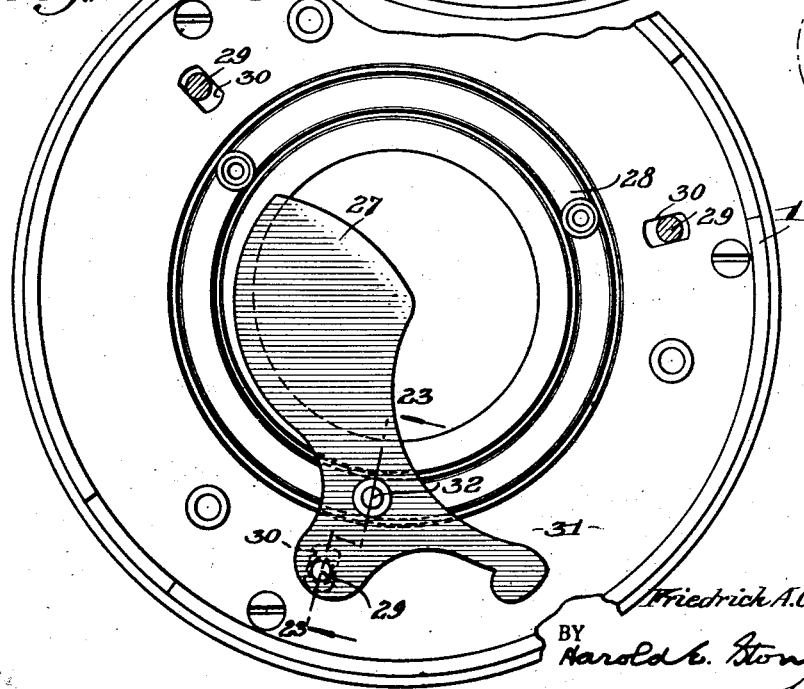

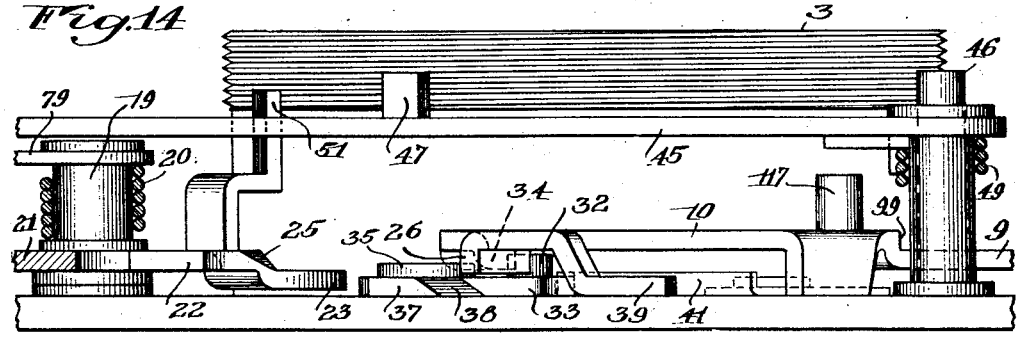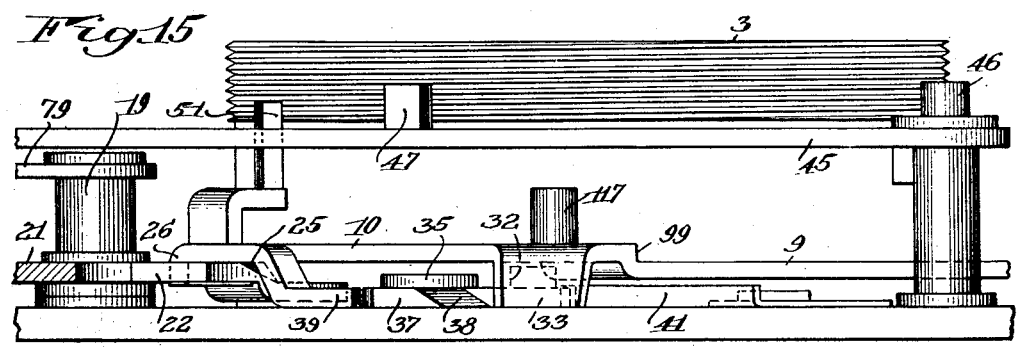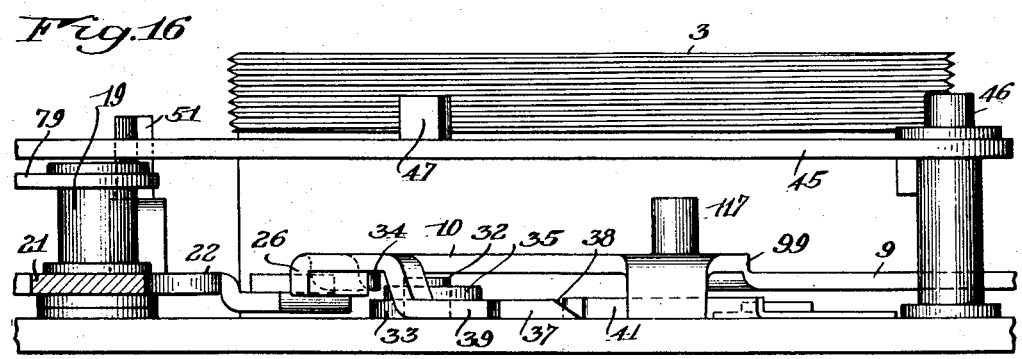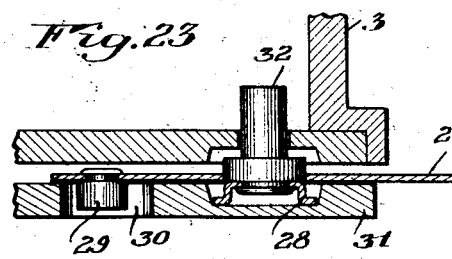

UNITED STATES PATENT OFFICE 2,331,568

PHOTOGRAPHIC SHUTTER

Friedrich A. Gustav Pirwitz, Rochester, N. Y., assignor to Wollensak Optical Company, Rochester, N. Y., a corporation of New York Application July 19, 1941, Serial No. 403,077

24 Claims. (Cl. 95—63)

This invention relates to a photographic shutter, with particular reference to a shutter of the set type in which a master operating member is placed under tension by a manually operated setting lever and upon release effects operation of the shutter either for time, bulb, or instantaneous exposures of any selected speed, and has for its purpose to afford a compact arangement of simpler and fewer parts than heretofore which enables higher speed instantaneous exposures than prior shutter mechanisms of this type and which lends itself to quieter and more accurate operations.

More particularly the invention has for its object to afford a mechanism that will permit efficient and accurate control of a shutter operation for instantaneous exposures up to 1/400 part of a second, while reducing the noise incidental to such operation to a minimum and avoiding excessive wear of any of the parts.

In prior structures, the shutter is held in normal or closed position and returned to such position by a spring, and it is an objective of the present invention to avoid the disadvantages of such a mechanism by opening and closing the shutter through a positive engagement of the master operating member with parts connected to the shutter blades and to retain the shutter in closed position by engagement of the master operating member, thus avoiding the necessity of having to overcome the tension of a spring upon opening the shutter, and to this extent increasing the efficiency and speed of the mechanism.

Another purpose of the invention is to provide a master operating member having an operating end portion with a relatively long stroke, sufficient to permit such operating end portion while traveling in one direction to engage a shutter actuating lever to open the shutter and thereafter to engage other means connected to the shutter for closing the same and to remain engaged with the shutter means at the limit of its stroke to hold the shutter in closed position, thus providing a master operating member that cooperates in a practical fashion with a single stop member controlling either time or bulb exposures, a retarding mechanism, and a delayed action mechanism.

A further object of the invention is to provide a retarding mechanism associated with a control end portion of the master operating member having a relatively short stroke while exerting a pushing action against the retarding mechanism during operation of the shutter and acting to engage and retain the retarding mechanism in inactive position at the limit of such movement, said control end portion being withdrawn from engagement with the retarding mechanism to release the latter when the master operating member is set.

An additional purpose of the invention is to afford a single one-piece stop member that is selectively positionable for cooperation with the master operating member to govern its movements for either time or bulb exposures and the movement of which is accurately determined by a single trigger which releases the master operating member and also controls and actuates the stop member.

Still a further object of the invention is to afford a master operating member that is constructed so as to enable practical and efficient correlation with the parts referred to above and to allow locating a delayed action mechanism in the shutter housing over a portion of the master operating member without interfering with the remaining parts, and permitting automatic operation of the shutter for any selected instantaneous exposure at the end of a predetermined interval after the trigger operation, depending upon the setting of the delayed action mechanism.

Another purpose of the invention is to afford a master operating member constructed so as to permit locating a delayed action mechanism above a portion thereof, and to cooperate with such delayed action mechanism efficiently and accurately, the latter including an escapement device that is engaged and retained by the operating end portion of the master operating member at either of its extreme positions and a means that is interposed in the path of the master operating member and is withdrawn from such path after the predetermined interval of time has elapsed.

Still a further object of the invention is to afford a compact arrangement of the various parts that can be located within a housing of acceptable size and in which the noise of moving parts is reduced to a minimum while there is no movement of any part after the instant when the shutter is closed.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a photographic shutter constructed in accordance with a preferred embodiment of the invention;

Fig. 2 is a side elevation of the same;

Fig. 3 is an enlarged plan view similar to Fig. 1, with the cover or index plate removed, and showing the adjustable controlling cam and the parts with which it cooperates;

Fig. 4 is a view similar to Fig. 3 with the controlling cam removed, and showing the normal or inactive position of the parts, prior to setting the master operating member;

Fig. 5 is a similar view with parts removed, showing the position of the trigger and master operating member when the latter has been set and the stop member adjusted to position for a time exposure;

Fig. 6 is a similar view showing the position of the same parts when the trigger has been initially operated to the limit of its movement in one direction to open the shutter for a time exposure;

Fig. 7 is a similar view showing the position of the same parts when the trigger has been released and returned to initial position, the master operating member and stop member appearing in the positions just prior to the final time exposure operation of the trigger for closing the shutter;

Fig. 8 is a similar view showing the position of the same parts when the master operating member has been set and the stop member adjusted to position for a bulb exposure;

Fig. 9 is a similar view showing the position of the same parts when the trigger has been initially operated to the limit of its movement in one direction to open the shutter for a bulb exposure;

Fig. 10 is a similar view showing the position of the same parts when the master operating member has been set and the stop member adjusted for an instantaneous operation;

Fig. 11 is a similar view showing the position of the same parts after the trigger has been operated, the master operating member appearing in the course of its operating stroke after it has been released by the trigger and has moved far enough to open the shutter and just prior to its final shutter closing movement;

Fig. 12 is a similar view with parts removed, and showing the cooperating controlling means between the delayed action mechanism and the master operating member;

Fig. 13 is a similar view showing the master operating member in the position it occupies when retained by the delayed action mechanism;

Fig. 14 is an enlarged detail side elevation, partially in section, showing the operating end portion of the master operating member, the shutter actuating lever, and the trigger in normal or inactive positions;

Fig. 15 is a similar view showing the position of the same parts after the master operating member has been set and engaged by the trigger;

Fig. 16 is a similar view showing the position of the same parts after the trigger has been operated to release the master operating member, and the latter has engaged the shutter actuating lever to open the shutter;

Fig. 17 is a plan view of the trigger;

Fig. 18 is a view in side elevation of the same;

Fig. 19 is a plan view of the master operating member;

Fig. 20 is a view in side elevation of the same;

Fig. 21 is a plan view of the housing, showing one of the shutter blades;

Fig. 22 is a detail plan view of the gear member of the delayed action mechanism with which the operating lever therefor cooperates, and Fig. 23 is a detail sectional view on the line 23—23 of Fig. 21.

Referring more particularly to the drawings, which are approximately three times actual size of the mechanism in order to make clear the construction and operation of the smaller parts, and to Figs. 1 to 3 inclusive, 1 designates a side wall of a case or housing containing the shutter mechanism, 2 is a stationary cover or index plate suitably secured to the central collar 3 and located in the recessed face of the rotatively adjustable controlling cam 4. The latter has a knurled outer edge 5 to permit adjusting it, and carries a series of indications around its outer edge and adjacent to the cover plate 2 for cooperation with the index mark or indication 6 on the index plate. The controlling cam is turned to position it to select either a time, bulb, or instantaneous exposure from ½ to ¼₀₀ part of a second, and when adjusted cooperates with the master operating member, stop member, and retarding mechanism in a manner that will appear presently.

The shutter is under the control of a master operating member which is manually set or put under spring tension by the operator either before or after adjusting the controlling cam 4 for a time or bulb exposure and before or after tensioning the delayed action mechanism if this is used in conjunction with an instantaneous exposure, and the construction and operation of the master operating member will now be described.

Referring to Figs. 5 to 7, 19 and 20, the master operating member comprises a lever pivoted on a post 8 and including an elongated curved central portion 9 above which is located the delayed action mechanism to be described later, an operating end portion 10, and a control end portion 11 by which the master operating member is set. The control end portion 11 carries instrumentalities cooperating with the stop member and with the retarding mechanism in a manner that will be described presently and the operating end portion 10 is retained by the trigger when set and when released serves to operate the shutter.

Due to the construction of the master operating member and the relation of its pivotal point to its end portions, the operating end portion 10 has a relatively long stroke in a direction generally circumferentially of the housing, sufficient to effect positive opening and closing movements of the shutter during its travel in one direction from set position to normal position, while the control end portion has a relatively short stroke crosswise of the housing for governing the retarding mechanism and for cooperation with the stop member.

The master operating member is held in its normal position and put under tension by the spring 12, see Fig. 4, which surrounds the post 8 and has one end in engagement with the side wall of the housing while its opposite end engages under a shoulder 13 of the master operating member, see Figs. 19 and 20, and acts to hold the latter in its initial or normal position. The master operating member is set, or put under the operating tension of the spring 12, by means of a setting lever 14, see Fig. 4, that is suitably pivoted in the housing and carries an upstanding lug 15, which engages a curved edge 16 on the control end portion of the master operating member so as to swing the latter about its pivot from the normal position shown in Fig. 4 to the set position such for instance as shown in Fig. 5, the setting lever 14 being returned to its initial position by a suitable spring 17.

When the master operating member is thus set, it is retained in set position by a trigger pivoted on the post 19 and held in normal position by a spring 20, while 21 is a finger piece for operating the trigger. Referring to Figs. 5, 17 and 18, the trigger includes a locking portion or tail piece 22 carried by an arm 23 and separated from the body of the trigger by a slot 24, while 25 is a bevelled surface at the front of the tail piece 22. The operating end portion 10 of the master operating member is provided with means for lockingly engaging said trigger, such means consisting of a depending lug or finger 26, see Figs. 14 to 16, and 19, the spring character of the master operating member permitting said depending lug or finger 26 to ride upwardly over the bevelled surface 25 of the trigger during the setting operation. At the limit of the setting movement of the master operating member, the lug 26 drops into the slot 24 behind the locking portion 22, in the manner shown in Fig. 15, thereby holding the master operating member in set position until the trigger is operated to release it. When the trigger is operated, the master operating member moves to its normal position in two steps, if there is a time or bulb exposure, or by a continuous movement if an instantaneous exposure, and during such return movement of the master operating member, the shutter is opened and closed successively by positive engagement of the actuating instrumentalities, and the mechanism by which the shutter is thus operated will now be described.

Referring to Figs. 21 and 23, there are a series of shutter blades 27 each of which is pivotally mounted on an operating ring 28 and carries a stop 29 that is guided in a slot 30 of the supporting plate 31 so that as the ring 28 is turned first in one direction and then in the other, the several shutter blades are moved inwardly or outwardly successively to open and close the shutter. In order to effect this operation, the ring 28 carries a pin or projection 32, see Figs. 5 and 6, which extends into the path of means on the operating end portion of the master operating member, which actuates the pin 32 to the position shown in Fig. 4 to close the shutter and retain it closed. The pin 32 also lies in the path of a shutter actuating lever 33 which operates the shutter to open position and in turn is moved by the master operating member in the following manner.

To accomplish the movements just described, the operating end portion of the master operating member is provided with means comprising a nose or hook portion 34 that engages the projection 32 to move the shutter to closed position, the said nose 34 being engaged with the pin 32 when the master operating member is in normal position, as shown in Fig. 4. When the shutter is set, said nose 34 moves away from the pin 32, as shown in Figs. 5 and 6, and during the initial part of the return movement of the master operating member after it is released by operation of the trigger, the shutter is opened by the shutter actuating lever 33 that is pivoted on a post 35, see Fig. 12, and has a slot 36 which embraces the pin 32.

The actuating lever 33 carries a tail piece 37 having a bevelled face 38, and the operating end portion of the master member carries means consisting of a dog 39 that rides over said bevelled surface 38 and tail piece 37, as the master operating member is set, to occupy the position shown in Fig. 15, the dog 39 being then located behind the tail piece 37. When the master operating member is released upon moving the trigger, its initial return movement causes the dog 39 to engage the tail piece 37 of the shutter actuating lever and to push the latter from the position shown in Fig. 5 to the position shown in Fig. 6 to open the shutter. During this movement, the lever 33 rocks on its axis, as the shutter is opened, until the dog 39 clears the tail piece 37, and upon continuing movement of the master operating member, the nose 34 engages pin 32 and returns the shutter to closed position.

In order to prevent any movement of the shutter blades when the master operating member is set and moved out of engagement with the pin 32, there is preferably provided a leaf spring 41, see Fig. 12, which engages a notch 42 in the shutter actuating lever and retains the latter by a yielding engagement in its initial position with the shutter closed. The spring 41 is fixedly mounted at one end on a support in the housing and permits the shutter actuating lever to move out of engagement therewith for opening the shutter, as already described. Thus it will be seen that the shutter is normally held closed by positive engagement of the master operating member, it is positively moved to open position by the shutter actuating lever, and is finally moved to closed position by positive engagement of the master operating member, the length of stroke of the operating end portion of the master member being sufficient to permit such opening and closing movements of the shutter during movement of the said operating end portion in one direction. It will be understood that the opening and closing operations of the shutter as just described are separated by an interval for time or bulb exposures, and the mechanism by which this time interval is controlled will now be described.

The control end portion of the master operating member is provided with an upstanding arm 44 with which cooperates a single, one-piece stop member 45 that is in the nature of an arcuate plate pivoted on the post 46, see Fig. 5, and having an upstanding lug 47 that extends through a cam slot 48 in the controlling cam, see Fig. 3, so as to adjust the stop member 45 when the controlling cam is turned. The stop member 45 is actuated inwardly by a spring 49, see Fig. 11, and limited in its inward movement by a projection 51 extending upwardly from the trigger into the path of the stop member 45, as shown in Fig. 5.

The stop member is provided on its outer edge adjacent to its free end with an opening or recess 52 which permits movement of the arm 44 inwardly to the normal position shown in Fig. 4, and stop portions 53 and 54 on opposite sides of said recess 52, said stop portions functioning to engage the arm 44 and retain the master operating member against further movement after the shutter has been opened, for time and bulb exposures respectively, depending upon the position of the stop member as determined by adjustment of the controlling cam already referred to. The stop member 45 is also provided with slots or recesses 55 and 56 and a cam surface 57 to receive the projection 51 on the trigger when the latter is operated, in a manner that will appear presently.

When the controlling cam 4 is adjusted for a time exposure, the projection 47 on the stop member is in the cut-away portion 58 of the controlling cam and the stop member is free to move inwardly, being limited only by the projection 51 on the trigger, see Fig. 5. When the master operating member is set, as already described, the arm 44 moves outwardly from the recess or cut-away portion 52 until it occupies the position shown in Fig. 5, the stop member 45 being yieldable outwardly against its controlling spring to permit such movement of the arm 44. Upon operating the trigger, its projection 51 moves from the position shown in Fig. 5 into the slot 55 of the stop member, as shown in Fig. 6, permitting a corresponding inward movement of the stop member 45 under the action of its spring. This movement of the trigger releases the master operating member in the manner already described, and when the master operating member has moved sufficiently to open the shutter, the stop portion 53 will have moved over into the path of the arm 44, see Fig. 6, on the control end portion of the master operating member, thus holding the latter against further movement until a second operation of the trigger.

When the trigger is released from the position shown in Fig. 6, the parts move to the position illustrated in Fig. 7, in which the stop portion 53 retains the arm 44 against movement until a second operation of the trigger. The stop member is held in this position by the frictional engagement of the arm 44 thereagainst under the action of the spring which controls the master operating member and which at such moment is actuating the arm 44 inwardly against the outer edge of the stop member, and thereby holding the latter against outward movement. Consequently when the trigger is again operated to close the shutter, the projection 51 on the trigger enters the slot 56 of the stop member 45, engaging the cam surface 59 at one side of said slot and thereby moving the stop member outwardly from the position shown in Fig. 7, and releasing the arm 44 which is then free to move into the recess 52 of the stop member and to permit the master operating member to complete its movement and close the shutter in the manner previously described.

When the stop member is set for a bulb exposure, the lug 47, see Fig. 3, is engaged by the portion 61 of the controlling cam which is rotated to this extent, thus moving the stop member outwardly to the position shown in Fig. 8 so that the stop portion 54 is located in the path of the arm 44 on the master operating member when the latter is released. With the parts in the position shown in Fig. 8, when the trigger is operated to the limit of its movement in one direction to release the master operating member, the projection 51 on the trigger engages the cam surface 57 on the stop member 45 and moves the stop member outwardly so as to bring said stop portion 54 into the path of the arm 44 and retain the latter against further movement, as shown in Fig. 9, until the trigger is released, whereupon the stop member moves inwardly under the action of its controlling spring to its normal position and the arm 44 is free to enter the recess 52 and permit the master operating member to complete its movement and close the shutter.

During the instantaneous exposures for any selected speed, a retarding mechanism is provided for cooperating with the master operating member to regulate the speed at which it moves upon release, and in the present construction, the arrangement is such that the master operating member during the final portion of its operating movement exerts a continuous pushing action on a part of the retarding mechanism. The retarding mechanism is not released for action until the master operating member is set or put under tension, and the master operating member at the end of its operating movement is engaged with the retarding mechanism and retains it against any movement until another setting operation of the master lever. The mechanism by which this is accomplished will now be described in detail.

The control end portion of the master operating member is provided with an upstanding lug 63 which engages an extension 64, see Figs. 4 and 12, on the gear element 65 forming part of the retarding mechanism, and thereby holds the retarding mechanism in inactive position, as shown in Fig. 4, until the master operating member is set. Thereupon the lug 63 moves away from the extension 64 and releases the retarding mechanism, the gear element 65 then moving to the position shown in Fig. 11, where the extension 64 is in position to be reengaged by the lug 63 during the operating movement of the master operating member.

The gear element 65 is pivoted on the post 66 and moved inwardly under the impulse of the spring 67, being limited in such movement by the stationary arm 68 that is in the path of the upstanding projection 69 on the gear element. The gear element 65 engages a pinion 71 mounted on an arbor which carries a gear 72, see Figs. 4 and 12, which in turn engages a pinion 73 on an arbor that carries the escapement wheel 74, the latter being engaged by the spring-actuated escapement lever 75, as usual in this type of construction. The escapement lever 75 is mounted on a spring-actuated pivoted plate 76 that carries an upstanding pin 77 extending through a slot 78 in the stationary plate 79. The pin 77 of the escapement lever extends through a slot 81 in the controlling cam, see Fig. 3, the slot being so formed as to move the escapement lever out of engagement with the escapement wheel when the controlling cam is set for instantaneous exposures of higher speeds and also for the time and bulb exposures.

The gear element 65 also is provided with a slot 82 in its operating edge beyond the range of its pinion teeth and adapted to engage a pin 83 on the gear 72 so as to change the speed ratio between these parts and thus reduce the resistances offered by the retarding mechanism for certain speeds, this particular arrangement being in accordance with the disclosure of my earlier Patent No. 2,165,574, July 11, 1939. The principal difference between the retarding mechanism herein disclosed and that of the earlier patent referred to is that in the prior structure, the master controlling member wiped over the retarding mechanism during its operating movement and then released it, the retarding mechanism returning to its normal position after its disengagement from the master operating member and immediately upon the closing of the shutter, whereas in the present structure, the master operating member through the lug 63 exerts a pushing action against the retarding mechanism and retains contact therewith at the end of its operating movement. The retarding mechanism is thus held out of active position while the master operating member is in its normal position and is not returned to active position by its spring until released by the lug 63, when the master operating member is again set, in the manner already described.

After the master operating member is set, it is necessary to hold the retarding mechanism in different initial positions to exert varying resistances upon the movement of the master operating member for different speeds of exposure, and this is accomplished through the upstanding projection 69 on the gear element 65, said projection extending through the slot 84 in the controlling cam, see Figs. 3 and 8, so that when the controlling cam is adjusted for any particular exposure, after setting the master operating member, the controlling cam holds the retarding mechanism in the proper position. For a time exposure, the controlling cam is adjusted so that the projection 69 rests against the portion 85 of the slot 84, see Fig. 3. When the cam is adjusted for a bulb exposure, the projection 69 rests against the surface 86 of the cam, for the lower speeds of instantaneous exposures, the cam is positioned so that the projection 69 rests against some portion of the surface 87 of the cam, and for the higher speeds, the controlling cam is adjusted so that the projection 69 engages some portion of the surface 88 of the cam in which position the escapement pawl previously described is withdrawn from cooperation with the escapement wheel and retarding mechanism. It is also desirable to impose additional spring tension on the master operating member for the highest speed, and this is attained by a supplemental coil spring 89 mounted on a post 91, said spring having its lower end engaging the control portion of the master operating member while its upper end lies in the path of a lug 92 on the inner face of the controlling cam so that when the latter is adjusted for the highest speed of 1/400 part of a second, said projection 92 engages the upper end of the spring 89 to tension the latter and thus impart additional power to the master operating member for increasing its speed of movement.

The structure thus far described has to do with the operation of the shutter for time, bulb, or instantaneous exposures, and the master operating member and its associated parts are so designed as to cooperate with a delayed action mechanism so that upon operating the trigger, an instantaneous exposure of any selected speed will take place after a predetermined interval, and the structure of the delayed action mechanism and its control of the master operating member will now be described.

Referring to Figs. 4, 12, 13 and 22, the delayed action mechanism includes a supporting plate 94 that is pivotally mounted on a post 95 and is slotted at 96 to afford a yieldable spring portion 97 engaging the side wall of the housing, see Fig. 13, and thereby moving the plate, when released, in position to engage the master operating member and retain it against movement for a predetermined period, in accordance with the position to which the delayed action mechanism is set, as will be described presently. The supporting plate 94 carries a dog 98, movable laterally between the two positions illustrated in Figs. 12 and 13, and when in the position shown in Fig. 13, said dog 98 engages a shoulder 99 on the master operating member, and when the dog 98 is moved laterally to the position shown in Fig. 12, it is displaced from the path of the shoulder 99 and the master operating member is free to continue its operating movement.

The position of the supporting plate 94 is determined by an operating lever 101 mounted on a post 102 and carrying a plate provided with oppositely arranged spring fingers 103 which ride over a series of radially arranged slots 104 on a gear 105 when the lever 101 is turned in one direction, and which engage said slots to actuate said gear upon the return movement of the lever 101, the operating lever being returned to its initial position by a spring 106.

The lever 101 has a cut-away portion which receives the end 107 of the supporting plate 94, see Fig. 13, and at opposite ends of said cut-away portion are the surfaces 108 and 109 which engage said end portion 107 of the supporting plate at the extreme positions of the lever 101. The return movement of the lever 101 to its initial position is controlled by a train of gears engaging the aforementioned gear 105 and including an escapement wheel 112 that is controlled by a pivoted escapement lever 113, see Fig. 4. The escapement lever 113 is pivoted on a post 114 and includes means for engaging the master operating member whereby the latter in either of its extreme positions engages the escapement lever and holds it against movement. Said means comprises an arm 115 at the outer end of the escapement lever and a pin 116 extending laterally from the inner end of the escapement lever, said arm and pin being disposed in the path of a stop 117 that is mounted on the operating end portion of the master operating member.

With this arrangement, when the master operating member is in normal position, the stop 117 engages the lateral pin 116 on the escapement lever, as shown in Fig. 4, and holds the escapement lever against movement. With the parts in this position, the delayed action mechanism can be set by moving the operating lever 101 outwardly to any desired extent determined by the length of interval that is desired. Either before or after the delayed action mechanism is set, the master operating member can be set in the manner already described, and when thus set, the stop 117 will have moved to the position indicated in dotted lines in Fig. 4 and engaged the arm 115 on the escapement lever, thus holding the latter and the delayed action mechanism against movement until the trigger is released.

It will be understood that during the setting action of the master operating member, there is sufficient spring to the supporting plate 94 on which the dog 98 is carried to permit the shoulder 99 to ride under the locking dog 98, which latter is then in position to engage said shoulder 99 on the return or operating movement of the master operating member. Upon operation of the trigger, the master operating member is released in the manner previously described, and moves far enough to disengage the stop 117 from the escapement lever 113 and release the escapement and delayed action mechanism, but further movement of the master operating member sufficiently to open the shutter is prevented by the dog 98 engaging the shoulder 99, as shown in Fig. 13. This holds the master operating member against further movement until the delayed action mechanism has completed its return movement, whereupon the stop 108 on the lever 101 engages the extremity 107 of the plate 94 and swings said plate sufficiently to disengage dog 98 from the shoulder 99 on the master operating member, which is then free to complete its operating movement, opening and closing the shutter successively, in the manner previously described.

While the invention has been described with reference to the details of construction herein disclosed, it is not confined to such arrangement, and this application is intended to cover any modifications or departures coming within the purposes or intent of the invention or the scope of the following claims.

I claim:

1. In a photographic shutter, the combination with a master operating member, of a shutter blade operating ring movable in opposite directions and a shutter actuating lever connected with said operating ring and operating to move it only in one direction, the shutter actuating lever being movable in opposite directions, means on the operating ring located in the path of the master operating member and engaged thereby when the shutter is closed, and instrumentalities formed integrally with and rigidly mounted on the master operating member and acting successively to engage and move said shutter actuating lever to open the shutter and to engage said means on the operating ring to close the shutter, said rigid instrumentalities on the master operating member being located on opposite sides of the pivotal axis of said shutter actuating lever.

2. In a photographic shutter, the combination with a master operating member, of a shutter blade operating ring movable in opposite directions, a projection on the operating ring located in the path of a portion formed integrally with and rigidly mounted on the master operating member and engaged thereby when the shutter is closed, and a shutter actuating lever connected to said operating ring and operating to move it in one direction only, said shutter actuating lever being located between said ring and the master operating member and movable in opposite directions, the latter being provided with means formed integrally therewith and rigidly mounted thereon that engages and moves said shutter actuating lever, the master operating member acting while traveling in one direction to first engage and move the shutter actuating lever and shutter blade operating ring to open the shutter and then to engage and move the shutter blade operating ring to close the shutter and further acting to hold the shutter closed.

3. In a photographic shutter, the combination with a master operating member, of a shutter blade operating ring movable in opposite directions, a projection on the blade operating ring, a shutter actuating lever connected with said operating ring and operating to move it in one direction only, means formed integrally with and rigidly mounted on the master operating member that engages and moves said actuating lever to open the shutter, said actuating lever being movable in opposite directions, and additional means formed integrally with and rigidly mounted on the master operating member that engages said projection after the shutter is open and effects closing of the shutter and retains the shutter in closed position by continued engagement with said projection.

4. In a photographic shutter, the combination with a master operating member, of a shutter blade operating ring movable in opposite directions, a projection on the blade operating ring, a pivoted shutter actuating lever connected with said ring and operating to move it in one direction only, said shutter actuating lever being located between the ring and the master operating member and movable in opposite directions, means formed integrally with and rigidly mounted at the inner edge of the master operating member which engages said projection acting to move the blade operating ring in one direction and which retains the shutter in closed position by continued engagement with said projection, and means formed integrally with and rigidly mounted at the outer edge of the master operating member which engages said shutter actuating lever acting to move the ring in the opposite direction and to open the shutter during the initial part of the operating movement of the master member.

5. In a photographic shutter, the combination with a master operating member, of a shutter blade operating ring movable in opposite directions, a projection on the blade operating ring, a shutter actuating lever connected to said projection and operating to move it in one direction only, said shutter actuating lever being moved by the master operating member during the initial part of its operating travel and acting to move the blade operating ring and open the shutter, the shutter actuating lever being movable in opposite directions, means formed integrally with and rigidly mounted on the master operating member having engagement with said shutter actuating lever to move the latter, and separate means formed integrally with and rigidly mounted on the master operating member engageable during the latter part of its operating travel with said projection on the blade operating ring and acting to move the ring in the opposite direction and to retain the latter with the shutter in closed position by continued engagement with said projection.

6. In a photographic shutter, the combination with a master operating member, of a shutter blade operating ring movable in opposite directions, a projection on the blade operating ring, oscillatory instrumentalities actuated by a portion formed integrally with and rigidly mounted on the master operating member during the initial part of its operating travel which engage said projection and move it in one direction to open the shutter, said instrumentalities being movable in opposite directions, and means formed integrally with and rigidly mounted on the master operating member engageable during the latter part of its operating stroke with said projection and acting to move the latter in the opposite direction to close the shutter and retain it in closed position by continued engagement with said projection.

7. In a photographic shutter, the combination with a master operating member, of a shutter blade operating ring movable in opposite directions, a projection on the blade operating ring, a pivoted shutter actuating lever connected to said projection and operating to move it in one direction only, an operating portion formed integrally with and rigidly mounted on said master operating member acting when the latter travels in one direction for setting to slide over said shutter actuating lever and to move the latter when traveling in the opposite direction during the operating travel of the master member to move the blade operating ring and open the shutter, said shutter actuating lever being movable in opposite directions, and separate means formed integrally with and rigidly mounted on the master operating member engageable with said projection and acting to move said ring in the opposite direction and retain the shutter closed by continued engagement with said projection, a pivoted trigger having a retaining portion, and locking means carried by the master operating member and slidable over said retaining portion into engagement therewith during the setting movement of the master operating member.

8. In a photographic shutter of the set type, the combination with a master operating member that is operable to effect movement of the shutter for time, bulb, or instantaneous exposures, of a single pivoted spring-actuated stop member that is selectively positionable and which cooperates with said master operating member to control its movements for time or bulb exposures, said stop member having a cam portion and a plurality of slots at one edge and a trigger movable independently of the stop member and operatively associated with said master operating member and acting to release the same, the trigger having means engageable with said cam portion and slots in the stop member and acting to govern the position of the latter.

9. In a photographic shutter of the set type, the combination with a master operating member that is operable to effect movement of the shutter for time, bulb, or instantaneous exposures, of a single pivoted stop member that is spring-actuated in one direction and is selectively positionable for cooperation with said master operating member to control its movements for time or bulb exposures, said stop member having a cam portion and a plurality of slots at one edge, and a trigger movable independently of the stop member and operatively associated with said master operating and stop members, said trigger acting to release the master operating member and to limit movement of the stop member in one direction and having means engageable with said cam portion and slots in the stop member to actuate it in the other direction and govern its positions during time or bulb exposures.

10. In a photographic shutter of the set type, the combination with a master operating member that is operable to effect movement of the shutter for time, bulb, or instantaneous exposures, of a single spring-actuated movable stop member cooperating with the master operating member to control its movements for time or bulb exposures, said stop member having a cam portion and a plurality of slots at one edge, and a trigger movable independently of the stop member and operatively associated with said master operating and stop members and acting to release the master operating member and having means engageable with said cam portions and slots in the stop member acting to govern the position of the stop member during time or bulb exposures.

11. In a photographic shutter of the set type, the combination with a master operating member that is operable to effect movement of the shutter for time, bulb, or instantaneous exposures, of a single spring-actuated pivoted stop member that is positionable to control the movements of the master operating member for time or bulb exposures, said stop member having a cam portion and a plurality of slots at one edge, and a trigger movable independently of the stop member and operatively associated with the master operating and stop members and acting to release the master operating member, said trigger having means engageable with said cam portion and slots in the stop member and acting to govern the positions of the stop member during time or bulb exposures.

12. In a photographic shutter, the combination with a master operating member that is operable to effect movement of the shutter for time, bulb, or instantaneous exposures, of a single pivoted stop member that is spring-actuated in one direction and is selectively positionable for cooperation with said master operating member to control its movements for time or bulb exposures, said stop member having a recess in one edge, an arm on the master operating member that is movable into said recess during an instantaneous exposure, stop portions on opposite sides of said recess that engage and retain said arm during time and bulb exposures respectively, and a trigger operatively associated with said master operating and stop members and acting to release the master operating member and to govern the positions of the stop member during the time or bulb exposures.

13. In a photographic shutter, the combination with a master operating member that is operable to effect movement of the shutter for time, bulb, or instantaneous exposures, of a single stop member that is pivoted at one end and spring-actuated in one direction, said stop member being selectively positionable for cooperation with the master operating member to control its movements for time or bulb exposures, the stop member having a recess in one edge at its free end, an arm on the master operating member that is movable into said recess during an instantaneous exposure, stop portions on opposite sides of said recess that engage and retain said arm during time and bulb exposures respectively, a trigger operatively associated with said master operating and stop members and acting to release the master operating member, and means carried by the trigger engageable with the opposite edge of said stop member to actuate and control the positions of the stop member.

14. In a photographic shutter, the combination with a master operating member that is operable to effect movement of the shutter for time, bulb, or instantaneous exposures, of a single stop member that is spring-actuated in one direction and is selectively positionable for cooperation with the master operating member to control its movements for time or bulb exposures, said stop member having a recess in one edge adjacent its free end and a plurality of slots in its opposite edge intermediate its ends, an arm on the master operating member that is movable into said recess during an instantaneous exposure, stop portions on opposite sides of said recess that engage and retain said arm during time and bulb exposures respectively, a trigger operatively associated with said master operating and stop members and acting to release the master operating member, and an arm on said trigger engageable with said opposite edge of the stop member and movable into said slots for actuating and controlling the position of the stop member.

15. In a photographic shutter of the set type, the combination with a master operating member that is positionable and operable to effect movement of the shutter for time, bulb, or instantaneous exposures, of spring-actuated retarding mechanism governing the instantaneous exposures and including a train of gears and a gear segment operatively connected thereto and having a portion located in the path of said master operating member which during the final portion of its operating movement engages said portion of the gear segment with a pushing action, the gear segment being engaged by the master operating member at all times when the shutter is closed and the master operating member inactive and acting to hold the gear train against movement until the master operating member is reset.

16. In a photographic shutter of the set type, the combination with a master operating member that is positionable and operable to effect movement of the shutter for time, bulb, or instantaneous exposures, of spring-actuated retarding mechanism governing the instantaneous exposures and including a train of gears and a gear segment operatively connected thereto and having a portion that lies in the path of the master operating member and is engaged thereby and pushed to inactive position during the final portion of its operating movement, the master operating member when in set position being spaced from said portion and engaged therewith at the limit of its operating movement and acting to retain the gear segment and retarding mechanism in inactive position at all times when the shutter is closed and the master operating member inactive and until the master operating member is reset.

17. In a photographic shutter of the set type, the combination with a master operating member that is positionable and operable to effect movement of the shutter for time, bulb, or instantaneous exposures, of spring-actuated retarding mechanism governing the instantaneous exposures and including a train of gears and a gear segment operatively connected thereto and having an operating portion located in the path of the master operating member and engaged thereby at all times when the master operating member is in normal inactive position and the shutter closed and spaced therefrom when the master operating member is in set position, the master operating member engaging said operating portion with a pushing action until the gear segment and retarding mechanism are in inactive positions where they are retained by the master operating member until the latter is reset.

18. In a photographic shutter of the set type, the combination with a master operating member that is positionable and operable to effect movement of the shutter for time, bulb, or instantaneous exposures, of spring-actuated retarding mechanism governing the instantaneous exposures and including a train of gears and a gear segment operatively connected thereto and having an operating portion located in the path of the master operating member, the latter engaging and retaining the gear segment and retarding mechanism in their inactive positions when the shutter is closed and the master operating member is inactive and until released by resetting the master operating member.

19. In a photographic shutter, the combination with a pivoted oscillatory master operating member including an operating end portion located remotely from its pivotal point and having a long stroke, and a control end portion located at a short distance from its pivotal point and having a short stroke, of a single spring-actuated stop member that is selectively positionable and which cooperates with said control end portion of the master operating member, said stop member having a cam portion and a plurality of slots at one edge, and a trigger movable independently of the stop member and operatively associated with the operating end portion of the master operating member and the stop member and operable to release the master operating member, the trigger having means engageable with said cam portion and slots in the stop member acting to govern the positions of the stop member during time or bulb exposures.

20. In a photographic shutter, the combination with a pivoted oscillatory master operating member including an operating end portion that is remote from its pivotal point and having a long stroke, and a control end portion located a short distance from its pivotal point and having a short stroke, of a shutter blade operating ring, a shutter actuating lever connected with said operating ring and operating to move it only in one direction, the shutter actuating lever being movable in opposite directions, means on said operating ring located in the path of the operating end portion of the master operating member and engaged thereby when the shutter is closed, and instrumentalities formed integrally with and rigidly mounted on the master operating member which successively engage and move said actuating lever to open the shutter and engage said means on the operating ring to close the shutter, said integral rigid instrumentalities being located on opposite sides of the pivotal axis of said actuating lever.

21. In a photographic shutter of the set type, the combination with a pivoted oscillatory master operating member that is positionable and movable to effect time, bulb, or instantaneous exposures, said master operating member including an operating end portion remote from its pivotal point and having a long stroke and a control end portion at a short distance from its pivotal point and having a short stroke, of spring-actuated retarding mechanism including a train of gears and a gear segment connected thereto and having a portion located in the path of means carried by said control end portion of the master operating member which engages said portion of the gear segment as the master operating member approaches the limit of its operating movement whereby said means pushes said gear segment during said operating movement, the master operating member acting to engage said gear segment and hold it and the gear train against movement while the shutter is closed and the master operating member inactive and until the master operating member is reset.

22. In a photographic shutter of the set type, the combination with a pivoted oscillatory master operating member including an operating end portion remote from and opposite to its pivotal point and having a long stroke along substantially a straight line and a control end portion at a short distance from its pivotal point and having a short stroke, a trigger associated with said operating end portion and operable to release the same, a delayed action mechanism located over the master operating member between its pivotal point and said operating end portion, said delayed action mechanism including means engageable with the operating end portion of the master operating member and operable to hold it against operating movement for a predetermined time after its release by said trigger.

23. In a photographic shutter of the set type, the combination with a pivoted oscillatory master operating member including an operating end portion remote from and opposite to its pivotal point and having a long stroke along substantially a straight line and a control end portion located a short distance from said pivotal point and having a short stroke, of a shutter blade operating ring, a shutter actuating lever connected with said operating ring for moving it in one direction, said shutter actuating lever being movable in opposite directions, said operating ring having means located in the path of the operating end portion of the master member and engaged thereby when the shutter is closed, instrumentalities fixed on the master operating member which successively engage said actuating lever and said means on the operating ring acting to effect movements of the ring in opposite directions for opening and closing the shutter during travel of said operating end portion in one direction, a trigger engageable with said operating end portion, and a delayed action mechanism located over the master operating member between said operating end portion and said pivotal point and including means engageable with said operating end portion of the master operating member and operable to hold the latter against movement for a predetermined time after its release by said trigger.

24. In a photographic shutter, the combination with a pivoted oscillatory master operating member including an operating end portion located remotely from and opposite to its pivotal point and having a long stroke along substantially a straight line and a control end portion located a short distance from its pivotal point and having a short stroke, of a shutter blade operating ring, a shutter actuating lever connected with said operating ring for moving it in one direction, said shutter actuating lever being movable in opposite directions, said operating ring having means located in the path of the operating end portion of the master member and engaged thereby when the shutter is closed, instrumentalities fixed on the master operating member which successively engage said actuating lever and said means on the operating ring acting to effect movements of the ring in opposite directions for opening and closing the shutter during travel of said operating end portion in one direction, a trigger engageable with said operating end portion, a delayed action mechanism located over the master operating member between said operating end portion and its pivotal point and including means engageable with said operating end portion of the master operating member and operable to hold the latter against movement for a predetermined time after its release by said trigger, and an escapement lever governing the last mentioned means and engaged by a stop carried by said operating end portion of the master member and acting to hold the escapement lever against movement when the master operating member is in either of its extreme positions.

FRIEDRICH A. GUSTAV PIRWITZ.